May 14, 1929.    H. S. JANDUS ET AL    1,713,384
BUMPER
Filed Jan. 19, 1927
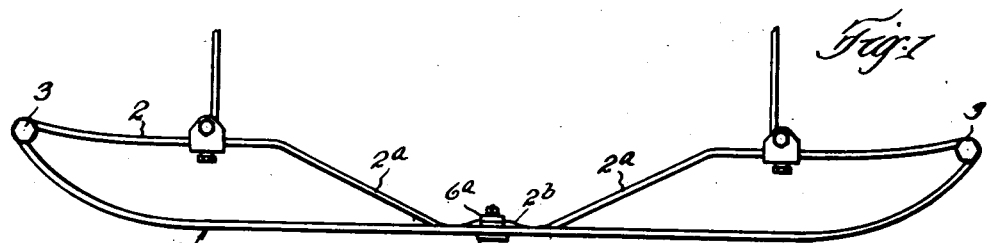
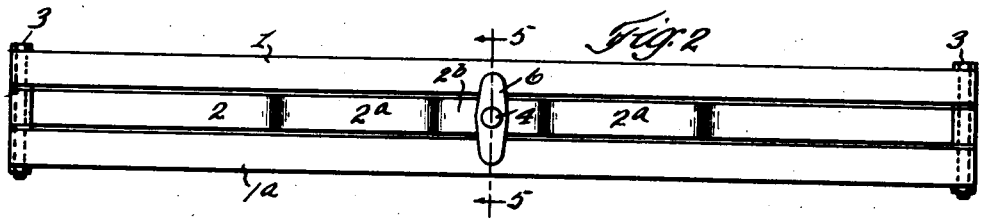
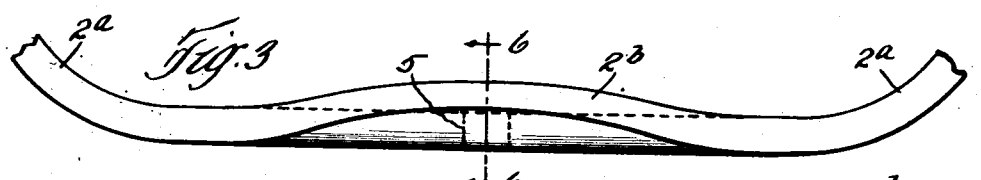
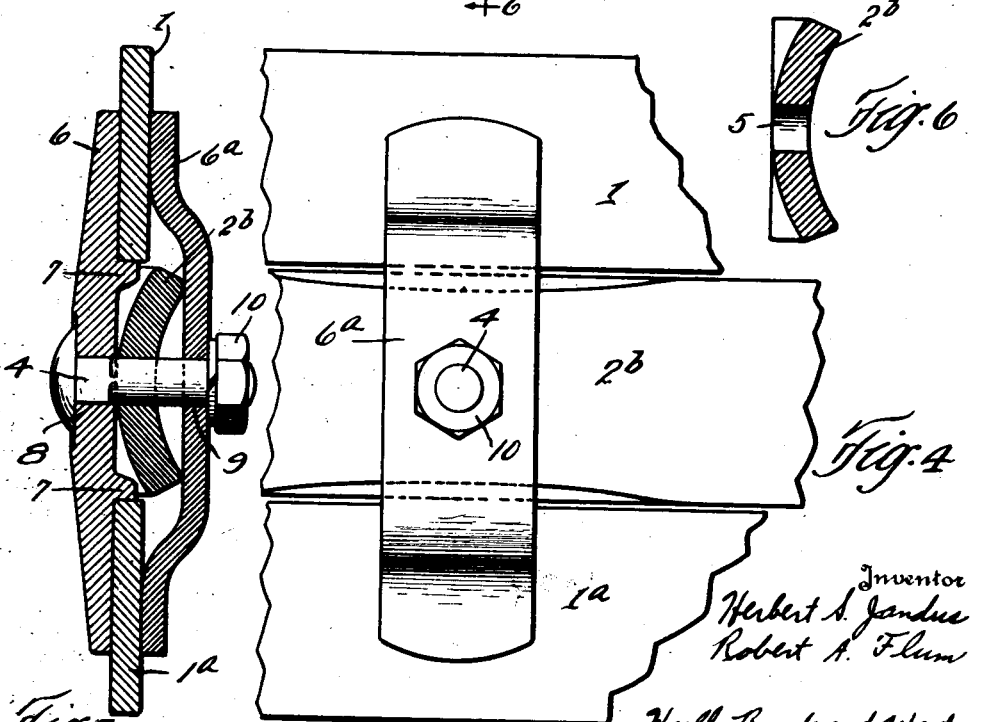
Inventor
Herbert S. Jandus
Robert A. Flum
Hull, Brock and West
Attorney Patented May 14, 1929.

1,713,384

UNITED STATES PATENT OFFICE.

HERBERT S. JANDUS AND ROBERT A. FLUM, OF DETROIT, MICHIGAN, ASSIGNORS TO THE C. G. SPRING & BUMPER COMPANY, OF DETROIT, MICHIGAN, A CORPORATION OF DELAWARE.

BUMPER.

Application filed January 19, 1927. Serial No. 162,150.

This invention relates to automobile bumpers and more particularly to means for reinforcing the back bar of an automobile bumper at the point where it is attached to the front bar by a center clamp and bolt.

It is the general object of this invention to provide a back bar which may be fastened to the impact element of the bumper by means of a single bolt passing through the back bar and which will be reinforced at the point where it is weakened by the hole for the bolt. It is a further object of the invention to provide novel means for rigidly clamping the back bar to the front bar, or bars, of the bumper.

A further advantage of the construction we have invented is that by means of the reinforcing bar with the curved cross section and the clamp attachment shown a suitable and effective bearing is provided by which the rear bar may be rigidly connected to the impact bar.

Further advantages of the invention will be apparent from the following description and drawings and from the use of the article covered by the claims.

In the drawings, Fig. 1 represents a plan view of an automobile bumper; Fig. 2 shows a front elevation of the bumper shown in Fig. 1; Fig. 3 shows a detail plan view of the central portion of the back bar; Fig. 4 shows a detail rear elevation of the central portion of the assembled impact bars, back bar and clamping means; Fig. 5 shows a sectional view of the assembled bumper taken on the line 5—5 of Fig. 2; Fig. 6 shows a sectional view of the back bar taken on the line 6—6 of Fig. 3.

In the following description the bumper will be considered as attached to the front end of a vehicle and the terms "front" and "rear" will be used in view of such attachment although it is not intended to so limit the use of the bumper to any particular position on the vehicle.

Of the reference characters shown in the figures 1 denotes a bumper which may be of the type shown in the McGregor Patent 1,372,154, issued March 22, 1921, said bumper comprising a pair of vertically spaced impact bars 1 and $1^a$ with a rear bar 2 having its ends pivotally connected to the ends of the bars 1 and $1^a$ by bolts 3. The central portion $2^a$ of the rear bar is bent forwardly and may be projected between the central portions of the bars 1 and $1^a$.

The rear bar is rigidly connected to the impact bars by means of a center clamp 6, $6^a$, to be more fully described hereinafter, and bolt 4 which passes through the hole 5 in the forwardly bent portion $2^a$ of the rear bar. The portion of the rear bar which is pierced by the hole 5 has its edges curved rearwardly, as shown at $2^b$, in order to increase the effective thickness of the bar and to give added strength at this point.

The center clamp is made up of a front plate 6 having rearwardly extending projections 7 adapted to fit between the vertically spaced bars 1 and $1^a$ and having its central portion adapted to bear upon the forward surface of the curved portion $2^b$ of the rear bar, and rear plate $6^a$ being bent rearwardly intermediate its ends and adapted to bear at its end portions upon the impact bars 1 and $1^a$ and at its central portion upon the rear edges of the curved portion $2^b$ of the rear bar. The bolt 4 passes through the hole 8 in the front plate 6, through the hole 5 in the rear bar 2 and through the hole 9 in the rear plate $6^a$. When the nut 10 is tightened a pressure is exerted upon the plates 6 and $6^a$ and transmitted through them to the impact and rear bars of the bumper, thereby holding them rigidly against relative movement at this point.

Since the stiffness or rigidity of a bar varies directly as the width of the bar and directly as the cube of thickness of the bar, it is apparent that the rigidity will be greatly increased by increasing the thickness of the bar, even at the expense of decreasing the width. It is apparent therefore that if the cross section of the bar at a particular portion were shaped to increase its effective thickness the rigidity of that portion as compared to that at other points in the bar would be very much greater. It is also well known that the effective thickness of a channel shaped bar set on edge is equal to the depth of the channel plus the thickness of the web. It follows, therefore, that the rigidity of the rear bar 2 would be greatly increased at the point $2^b$ because of the increased effective thickness at that point due to the change in shape of its cross section. In this manner the normal weakening of the bar at that point by the hole 5 is compensated for and the danger of breaking at this point is lessened.

It is apparent from the above description that it is within the scope of our invention to substitute for the curved section 2$^b$ a channel shaped, square, or any other, section wherein the effective thickness of the bar is increased at the point where the bar is pierced.

It is further apparent that it is within the scope of our invention to utilize this means of strengthening a bar at other points throughout the bumper where it is desired to pierce the bar, such for instance, as the point where the rear bar is connected to the support arms by means of which it is attached to the car. It is also apparent that the invention might be applied to other types of bumpers than that shown in the drawings, it being applicable wherever it is convenient to connect a bar to another by means of the bolt passing through one of the bars.

Having thus described our invention, what we claim is:—

1. A bumper bar having a hole therein between its points of support and having a curved cross section in the portion which is pierced.

2. In an automobile bumper the combination of two bars fastened together by means of a bolt passing through one of the bars, said last mentioned bar having a cross section of increased effective thickness in the portion which is pierced.

3. In an automobile bumper the combination of an impact element, a reinforcing bar having a hole therein and having the effective thickness of the bar increased in the portion which is pierced, and means for rigidly fastening the reinforcing and impact bars together.

4. In an automobile bumper the combination of an impact element, a reinforcing bar having a hole therein and having the effective thickness of the portion of the bar which is pierced increased, and means for rigidly fastening the reinforcing and impact bars together, said means consisting of a bolt passing through the reinforcing bar and a clamp adapted to bear on the reinforcing bar and the impact element.

5. An automobile bumper including a pair of vertically spaced impact bars, a reinforcing bar, bent forwardly for attachment to the impact bars, having a hole through it at the point where it is to be connected to the impact element and having a channeled cross section in the portion which is pierced, and means for connecting the reinforcing bar to the impact element.

6. An automobile bumper including a pair of vertically spaced impact bars, a reinforcing bar, bent forwardly for attachment to the impact bars, having a hole through it at the point where it is to be connected to the impact element and having a channeled cross section in the portion which is pierced, a clamp for connecting the reinforcing bar to the impact element, said clamp consisting of a plate adapted to bear upon the outer surface of the impact elements and upon the forward portion of the reinforcing bar, a second plate adapted to bear upon the inner surface of the impact bars and upon the rear portion of the reinforcing bar and means passing through the hole in the reinforcing bar for exerting a pressure upon the two sides of the clamp.

7. In an automobile bumper the combination of a pair of vertically spaced resilient impact bars, a resilient rear bar bent forwardly for connection to the impact bars and having a hole at the point where it is to be connected to the impact bars, the edges of that portion of the reinforcing bar being bent to form a cross section of increased effective thickness, and means for rigidly connecting the rear bar to the impact bar.

8. In an automobile bumper the combination of a pair of vertically spaced resilient impact bars, a resilient rear bar bent forwardly for connection to the impact bars and having a hole at the point where it is to be connected to the impact bars, the edges of that portion of the reinforcing bar being bent to form a cross section of increased effective thickness, and means for rigidly connecting the rear bar to the impact bar, said means consisting of a front plate adapted to bear at its upper and lower portions on the front of the impact bars and at its central portion upon the curved portion of the reinforcing bar, a second plate adapted to bear at its end portions upon the rear surfaces of the impact bars and at its central portion upon the rear surface of the curved portion of the rear bar, and means passing through the rear bar for rigidly holding the front and rear plates against the rear of the impact bars.

9. In a bumper the combination of an impact element, a rear bar adapted to be connected to said impact element, said rear bar having a cross section of increased effective thickness in the portion to be connected to the impact element, and means for securing the rear bar to the impact element.

10. In a bumper the combination of an impact element, a rear bar adapted to be connected to said impact element, said rear bar having a cross section of increased effective thickness in the portion to be connected to the impact element, and means for securing the rear bar to the impact element, said means including a plate adapted to bear upon the front surfaces of the impact element and rear bar and a second plate adapted to bear upon the rear surfaces of the impact element and rear bar.

11. In a bumper the combination of a pair of vertically spaced impact bars, a rear bar adapted to be connected to the impact bars intermediate their ends, said rear bar having a cross section of increased effective thickness in the portion which is to be connected to the impact bars and means for securing the rear bar to the impact bars.

12. In a bumper the combination of a pair of vertically spaced impact bars, a rear bar adapted to be connected to the impact bars intermediate their ends, said rear bar having a cross section of increased effective thickness in the portion which is to be connected to the impact bars and means for securing the rear bar to the impact bars, said means including a front plate adapted to bear at its end portions upon the front surfaces of the impact bars and at its central portion upon the front surface of the rear bar and a rear plate adapted to bear upon the rear surface of an impact bar and upon the rear surface of the rear bar and means for drawing said plates together.

13. In a bumper the combination of a pair of vertically spaced impact bars, a rear bar adapted to be connected to said impact bars intermediate their ends, said rear bar having a curved cross section in the portion which is to be connected to the impact bars and means for securing said rear bar to said impact bars.

14. In a bumper the combination of a pair of vertically spaced impact bars, a rear bar adapted to be connected to said impact bars intermediate their ends, said rear bar having a curved cross section in the portion which is to be connected to the impact bars and means for securing said rear bar to said impact bars, said means including a front plate adapted to bear at its end portions upon the front surfaces of the impact and rear bars, and a second plate adapted to bear upon the rear surfaces of the impact and rear bars and means for drawing said plates together.

15. In a bumper the combination of a pair of vertically spaced impact bars, a rear bar adapted to be connected to said impact bars intermediate their ends, said rear bar having a curved cross section in the portion which is to be connected to the impact bars and means for securing said rear bar to said impact bars, said means including a plate adapted to bear at its end portions upon the front surfaces of the impact bars and at its central portion upon the curved surface of the rear bar, and a second plate adapted to bear at its end portions upon the rear surfaces of the impact bars and at its central portion upon the rear surface of the rear bar and means for drawing the two plates together.

16. An automobile bumper having a pair of vertically spaced impact bars and a rear bar pivotally connected at its end portions to the end portions of the impact bars and adapted to be connected to the impact bars intermediate their end portions, said rear bar having a hole through the portion to be connected to the impact bars and having a cross section of increased effective thickness in that portion and means for securing said rear bar to said impact bars.

17. An automobile bumper having a pair of vertically spaced impact bars and a rear bar pivotally connected at its end portions to the end portions of the impact bars and adapted to be connected to the impact bars intermediate their end portions, said rear bar having a hole through the portion to be connected to the impact bars and having a cross section of increased effective thickness in that portion and means for securing said rear bar to said impact bars, said means including a plate adapted to bear upon the front surfaces of the impact and rear bars, a second plate adapted to bear upon the rear surfaces of the impact and rear bars, and means passing through said plates and said rear bar for drawing the plates together.

18. An automobile bumper having a pair of vertically spaced impact bars and a rear bar pivotally connected at its end portions to the end portions of said impact bars and adapted to be connected at its central portion to said impact bars, said rear bar having a curved cross section and a hole in said central portion, and means for securing said rear bar to said impact bars.

19. An automobile bumper having a pair of vertically spaced impact bars and a rear bar pivotally connected at its end portions to the end portions of said impact bars and adapted to be connected at its central portion to said impact bars, said rear bar having a curved cross section and a hole in said central portion, and means for securing said rear bar to said impact bars, said means consisting of a plate adapted to bear upon the front surfaces of the impact and rear bars and a rear plate adapted to bear upon the rear surfaces of the impact and rear bars and a bolt passing through said plates and said rear bar.

20. A bumper bar supported at its end portions having an aperture intermediate the points of support and having the cross section of the portion of the bar adjacent the aperture of increased effective thickness and of an area substantially equal to an end portion of the bar.

21. A bumper bar of substantially constant area of cross section supported at its end portions, having an aperture intermediate the points of support and having a cross section of increased effective thickness adjacent the aperture, said apertured portion having its edges so offset that when the bar is bent laterally at that point the greatest tensile stresses will be in a portion of the cross section of the bar in which the material is continuous.

22. A substantially flat bumper bar adapted to be supported at its end portions, said bar having an arched portion extending between the points of support and having the middle portion of such arched section shaped to form a section of increased effective thickness relative to the said end portions.

23. A substantially flat bumper bar supported at its end portions, arched forwardly between the points of support and having its middle portion of curved cross section, with the edges of the bar at such curved cross section bent rearwardly.

24. A bumper bar supported at its end portions, having an arched portion extending between its points of support, and having an aperture at the middle portion of said arch, said aperture being in a section of the bar of increased effective thickness.

25. A bumper bar supported at its end portions, having an arched portion extending between the points of support, and having an aperture in said arched portion, said aperture being in a section of the bar of increased effective thickness.

26. A bumper bar supported at its end portions, having an arched portion extending between the points of support, and having an aperture in said arched portion, said aperture being in a portion having a curved cross section.

27. A bumper bar supported at its end portions, having an arched portion extending between the points of support and having an aperture in said arched portion, said aperture being in a portion having a curved cross section and having its edges so offset that when the bar is bent laterally at that point, the greatest tensile stresses will be in a portion of the cross section wherein the material is continuous.

28. A bumper bar supported at its end portions, having a forwardly arched portion extending between the points of support and an aperture intermediate the edges of the middle portion of said arched section, said aperture being in a portion of the bar of increased effective thickness, with the edges of the bar bent rearwardly.

29. In a bumper the combination of an impact section made up of flat impact cars, a rear bar adapted to be connected to said impact bars by a bolt passing through said rear bar, said rear bar having a cross section of increased effective thickness in the portion to be connected to the impact section.

30. A bumper comprising an impact section and a reinforcing section having a portion arched forwardly, a section of said arched portion having a cross section of increased effective thickness.

31. A bumper comprising an impact section and a reinforcing bar arched forwardly between its points of support and having the middle portion of said arch of curved cross section.

32. A bumper comprising an impact section and a reinforcing bar arched toward said impact section intermediate its points of support and having an aperture in said arched portion, said reinforcing bar having the edges of the portion with the aperture therein curved away from the impact section.

33. A bumper comprising an impact section including a pair of vertically spaced impact bars, a reinforcing bar connected at its end portions to the end portions of the impact section, having a portion intermediate its ends arched toward said impact section, having an aperture in said arched portion and having the edges of the apertured portion bent away from said impact section, and means passing through said aperture for clamping said reinforcing bar to said impact section.

34. A bumper comprising an impact section made up of a plurality of vertically spaced bars fastened together at their end portions, a reinforcing bar adapted to be connected at its end portions to the end portions of the said impact section and having a middle section arched forwardly for connection to said impact section, said reinforcing bar having a portion of its middle section of decreased width and of increased effective thickness, and means for clamping said reinforcing bar to said impact section.

35. A bumper bar of substantially constant area of cross section supported at its end portions, having an arched portion extending between its points of support and having an aperture in said arched portion, said aperture being in a portion of the bar shaped to form a section of increased effective thickness.

36. A bumper bar supported at its end portions, having an arched portion extending between its points of support and having an aperture in the middle portion of said arch, said arch being in a section of the bar of increased effective thickness and having an area of cross section substantially equal to each of the end portions of the bar.

37. A bumper comprising an impact section and a reinforcing bar attached thereto by means of a bolt passing through said reinforcing bar, the cross section of said reinforcing bar being substantially constant throughout its length and being of increased effective thickness at the point at which it is pierced for the bolt.

In testimony whereof, we hereunto affix our signatures.

HERBERT S. JANDUS.
ROBERT A. FLUM.